United States Patent
Anderson (10) Patent No.: US 9,716,314 B2
(45) Date of Patent: Jul. 25, 2017

(54) STEERING SYSTEMS AND METHODS (71) Applicant: TAOGLAS GROUP HOLDINGS, Enniscorthy, County Wexford (IE)

(72) Inventor: Christopher M. Anderson, Minneapolis, MN (US)

(73) Assignee: TAOGLAS GROUP HOLDINGS, Enniscorthy, County Wexford (IE)

( * ) Notice: Subject to any disclaimer, the term of this patent is extended or adjusted under 35 U.S.C. 154(b) by 70 days.

(21) Appl. No.: 14/794,247

(22) Filed: Jul. 8, 2015

(65) Prior Publication Data

US 2016/0336651 A1    Nov. 17, 2016

Related U.S. Application Data

(60) Provisional application No. 62/159,491, filed on May 11, 2015.

(51) Int. Cl.
*G05B 11/32* (2006.01)
*H01Q 3/08* (2006.01)
(Continued)

(52) U.S. Cl.
CPC .............. *H01Q 3/08* (2013.01); *G05B 11/01* (2013.01); *H01Q 1/125* (2013.01); *H01Q 1/1228* (2013.01); *H01Q 19/132* (2013.01)

(58) Field of Classification Search
CPC .................................. H01Q 3/08; G05B 11/01
(Continued)

(56) References Cited

U.S. PATENT DOCUMENTS 5,296,862 A * 3/1994 Rodeffer ................ H01Q 1/125
342/359
5,471,219 A * 11/1995 Rodeffer ................ H01Q 1/125
342/359
(Continued)

FOREIGN PATENT DOCUMENTS

EP          1860404 A1    11/2007

OTHER PUBLICATIONS

Bursky, "RF Switches Simplify Multi-Antenna Systems", Aug. 23, 2012. http://www.digikey.com/en-US/articles/techzone/2012/aug/rf-switches-simplify-multi-antenna-systems.
(Continued)

*Primary Examiner* — Erick Glass
(74) *Attorney, Agent, or Firm* — Shartsis Friese LLP; Cecily Anne O'Regan (57) ABSTRACT

Disclosed are devices configurable with the location and motion of satellites can be configured to drive actuators connected to the motion of a steerable device. A steerable device may be augmented, for example, with gears or drivers to drive orientation, sensors to report current position and a mechanism to lock the device in place for the duration of the steering process such that power gears from the device mesh and can drive gears in the steerable device. Signals from the device intelligently guide the actuators to steer the orientation of the steerable device towards a satellite selected by a person or algorithm. Upon completion of the steering of steerable device by the device, the device can be detached, leaving the steerable device locked in place and fully functional as a steerable device, while also leaving the device capable if engaging with another similarly steerable device.

23 Claims, 7 Drawing Sheets

(51) Int. Cl.
*H01Q 1/12* (2006.01)
*G05B 11/01* (2006.01)
*H01Q 19/13* (2006.01)

(58) Field of Classification Search
USPC .......................................................... 318/625
See application file for complete search history.

(56) References Cited

U.S. PATENT DOCUMENTS

| | | | |
|---|---|---|---|
| 5,945,945 A * | 8/1999 | Wagner | H01Q 3/04 342/359 |
| 6,542,119 B2 | 4/2003 | Howell et al. | |
| 7,397,435 B2 * | 7/2008 | McEwan | H01Q 1/084 343/713 |
| 7,642,957 B2 | 1/2010 | Lennen et al. | |
| 7,786,933 B2 | 8/2010 | Chang | |
| 8,059,056 B2 | 11/2011 | Ma et al. | |
| 8,665,152 B1 | 3/2014 | Kling et al. | |
| 8,676,134 B2 | 3/2014 | Mele et al. | |
| 8,868,144 B2 | 10/2014 | Shi | |
| 2003/0107517 A1 | 6/2003 | Ikeda et al. | |
| 2008/0112468 A1 | 5/2008 | Sheynblat et al. | |
| 2011/0021166 A1 | 1/2011 | Walley et al. | |

OTHER PUBLICATIONS

LOCOSYS Technology Inc., LS20126 Stand-alone GPS with magnetic sensor smart antenna module. https://www.sparkfun.com/datasheets/GPS/Modules/LS20126_datasheet%20_V0.4%20-R.pdf.
Trimble, Antenna Companion Modules. http://www.trimble.com/embeddedsystems/antenna-companion-modules.aspx?dtID=overview.

* cited by examiner

STEERING SYSTEMS AND METHODS

CROSS-REFERENCE

This application claims the benefit of U.S. Provisional Application No. 62/159,491, filed May 11, 2015, entitled Steering Systems and Methods which application is incorporated herein by reference.

BACKGROUND

A variety of devices use steering systems. Steerable devices, such as antennas, are used for communication with a satellite in a geo-stationary orbit are either manually pointed by a human, or steered by use of a permanently attached steering apparatus. These antennas include, for example, satellite antennas and point terrestrial microwave antennas.

In many situations, such as used for satellite TV, the satellite dish is installed and pointed by a professional installation technician who has received expert training. The requirement for a trained technician to install the satellite dish adds significantly to the initial deployment cost for any commercial/consumer satellite system using geo-stationary satellites. Moreover, the steering apparatus and associated guidance system represent a great deal of cost. As will be appreciated by those skilled in the art, an expensive steering system to point a steerable device only once is wasteful and in many situations cost prohibitive. Other devices that rely on steering systems include, for example, telescopes and optical laser communication devices. What is needed is a way to install a steerable device which is optimized that is convenient and cost effective.

SUMMARY

An aspect of the disclosure is directed to steering systems. Steering systems comprise: a housing configurable to removably engage a steerable device; one or more drive actuators; and a controller configurable to receive a location and a motion of a target orbiting satellite and generate a positional instruction to the one or more drive actuators. The steering system includes one or more drivers which drive a position of the steerable device. Drivers include, for example, gears, friction wheels, belts, chains or directly applied motors. Additionally, in at least some configurations, the steering system includes a user interface. The steering system can also be configurable to communicate with an external computing device having a user interface.

Another aspect of the disclosure is directed to methods for steering a steerable device. Suitable methods comprise: attaching a removable steering system housing to the steerable device; obtaining a position of a target orbiting satellite; generating a positional instruction; delivering a positional instruction to the steerable device; locking a position of the steerable device based on the generated positional instruction; and removing the steering system. Additionally, the method can include: instructing one or more drivers to drive a position of the steerable device from a first position to a second position. The instruction can be achieved manually by a user or automatically or semiautomatically from the system. Additionally, in some configurations, the target orbiting satellite can be selected from a list of available orbiting satellites. In some configurations, the method includes communicating with an external computing device.

Yet another aspect of the disclosure is directed to steerable device steering means. Suitable steerable device steering means comprise: a housing means configurable to removably engage a means for receiving a satellite signal; one or more drive actuators means; and a controller means configurable to receive a location and a motion of a target orbiting satellite and generate a positional instruction to the one or more drive actuators means of the means for receiving the satellite signal. Additionally, the housing means is configurable to include one or more actuators means and one or more drivers means which drive a position of the means for receiving the satellite signal. In still other configurations, the steering system means includes a user interface means. The steering system means can also be configurable to communicate with an external computing device means.

Still another aspect of the disclosure is directed to methods for steering a means for receiving a satellite signal. Suitable methods comprise: attaching a removable steering system housing means to the means for receiving a satellite signal; obtaining a position of a target orbiting satellite; generating a positional instruction; delivering a positional instruction to the means for receiving a satellite signal; locking a position of the means for receiving a satellite signal based on the generated positional instruction; and removing the steering system means Additional steps can include one or more of instructing one or more positioning means to drive a position of the means for receiving the satellite signal from a first position to a second position; selecting the target orbiting satellite from a list of available orbiting satellites; and communicating with an external computing device means.

Another aspect of the disclosure is directed to steerable device systems. Systems comprise: a steerable device having one or more internal actuators; a steering system having a housing configurable to removably engage the steerable device; one or more drive actuators in communication with the one or more internal actuators of the steerable device; and a controller configurable to receive a location and a motion of a target orbiting satellite and generate a positional instruction to one or more drive actuators of the steering system. The steering system housing can include one or more drivers which drive a position of the steerable device. The steering system can also include a user interface. In at least some configurations, the steering system is configurable to communicate with an external computing device having a user interface.

Yet another aspect of the disclosure is directed to steering systems. Steering systems comprise: a portable computing device having a GPS sensor and a compass sensor configurable to removably engage a steerable device; a controller configurable generate a positional instruction wherein the positional instruction is provided to at least one of a user and one or more drive actuators of the steerable device. The housing can include one or more actuators and one or more drivers which drive a position of the steerable device. Additionally, the steering system is configurable to communicate with a remote computing device.

INCORPORATION BY REFERENCE

All publications, patents, and patent applications mentioned in this specification are herein incorporated by reference to the same extent as if each individual publication, patent, or patent application was specifically and individually indicated to be incorporated by reference. References include: U.S. Pat. No. 6,542,119 B2 issued Apr. 1, 2003, to Howell, et al., for GPS Antenna Array; U.S. Pat. No. 7,786,933 B2 issued Aug. 31, 2010, to Chang, et al., for Digital Beam-Forming Apparatus and Technique for a Multi-Beam Global Positioning System (GPS) Receiver; U.S. Pat. No. 8,059,056 B2 issued Nov. 15, 2011 to Ma, et al., for Directional Antenna and Portable Electronic Device Using the Same; U.S. Pat. No. 8,676,134 B2 issued Mar. 18, 2014, to Mele for Highly Reliable Receiver Front-End; U.S. Pat. No. 8,665,152 B1 issued Mar. 4, 2014, to Kling et al., for Enhancing Reception of Signals in Global Positioning System (GPS) Receiver Module; U.S. Pat. No. 8,868,144 B2 issued Oct. 21, 2014, to Shi for Smart Antenna System Using Orientation Sensors; US 2011/0021166 A1 published Jan. 27, 2011 to Walley et al. for Method and System for Antenna Diversity with Global Navigation Satellite Systems; US 2008/0112468 A1 published May 15, 2008 to Sheynblat, et al., for Apparatus and Method for Sensor-Based Wireless Receive Diversity; and EP 1860404 A1 published Nov. 28, 2007 to Shing et al. for GPS Product.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Disclosed is a removable steering system configurable to engage a steerable device, such as an antenna, wherein a removable driver module is configurable for use one or more times to steer the steerable device towards a satellite signal source. Once the steerable device has been successfully steered by the driver module, the orientation of the steerable device can be locked in place and the driver module removed.

The removable driver module may then be used on any other steerable device configured to communicate with a removable driver module. As would be appreciated by those skilled in the art, additional components can be added to the steerable device. These additional components can provide additional functionality, including the ability for gears or other mechanical translational devices, to manipulate the pitch and yaw of the steerable device, sensors to measure the pitch and yaw, and also a coupling mechanism to mechanically engage the device driver for at least the duration of steering to a preset orientation. Friction, vibration, gas/liquid pistons or any other suitable mechanism can be used to move the steerable device without departing from the scope of the disclosure.

I. Driver Module

Figure 1:
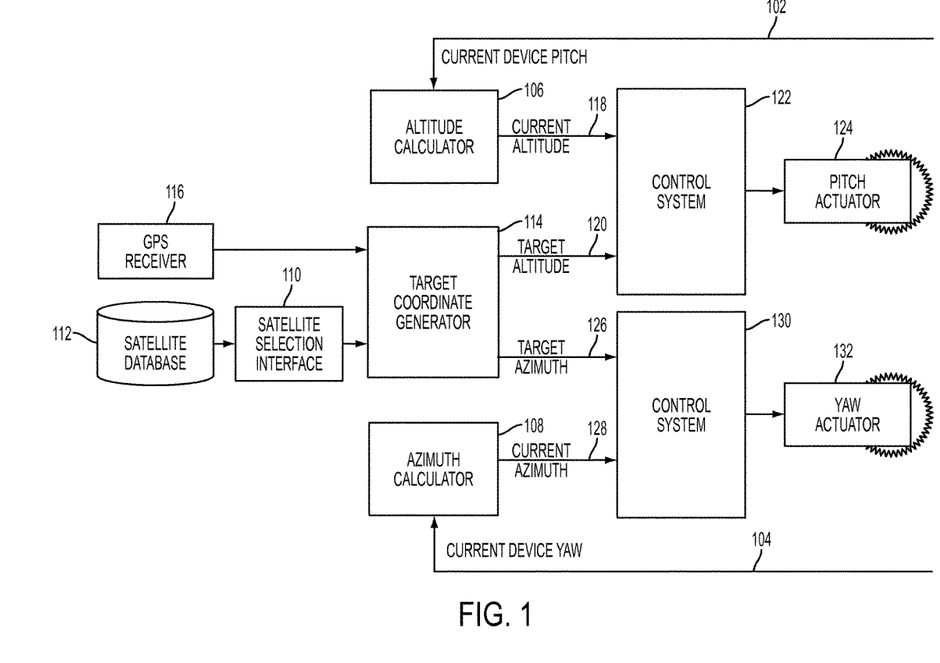
FIG. 1 is a block diagram of sub-systems comprising a driver module, including sensor signals, processing components and operation of driver gears driven by controlled actuators.

FIG. 1 is a block diagram of sub-components of a driver module according to the disclosure. The driver module is configurable to receive one or more raw sensor inputs. Raw sensor inputs include, for example, current steerable device pitch input 102 and current steerable device yaw input 104 which are receivable from the steerable device. Each raw sensor input, current steerable device pitch input 102 and current steerable device yaw input 104, may not be in a form which immediately reports a steerable device coordinate. Thus, the steerable device pitch input 102 can feed into a current altitude calculator 106 which is configurable to compute a current altitude and provide a current-altitude output 118 of the steerable device. As will be appreciated by those skilled in the art, an algorithm by which the current altitude calculator 106 maps the current steerable device pitch input 102 into a current-altitude output 118 can depend on the nature and format of the raw sensor data of the current steerable device pitch input 102. For example, the current steerable device pitch input 102 may be a raw accelerometer output, in order to minimize cost and complexity of the steerable device. The current altitude calculator 106 can then be configurable, in this example, to map raw accelerometer readings to compute the current-altitude output 118.

Current steerable device yaw input 104 feeds into current azimuth calculator 108 which uses current steerable device yaw input 104 as an input to compute and generate a current azimuth output 128 of the steerable device. The algorithm by which the current azimuth calculator 108 maps the current steerable device yaw input 104 into a current-azimuth output 128 will depend on the nature and format of the raw sensor data of the current steerable device yaw input 104. In one implementation, by example, the current steerable device yaw input 104 may comprise a fusion of sensor readings including magnetic compass and a calibrated, relative potentiometer reading. Both readings may be raw in order to minimize cost and complexity of the steerable device. The current azimuth calculator 108 can then be configured, in this example, to combine raw magnetometer readings with raw potentiometer readings to compute an accurate measure for the current-azimuth output 128.

A satellite selection interface 110 may be configured to display options read or retrieved from a satellite database 112. Each option pertains to specific geostationary satellite. An operator may select an option, thereby allowing selected satellite orbital data to be output to a target coordinate generator 114. The target coordinate generator 114 in this embodiment receives GPS from a GPS receiver 116 which the target coordinate generator 114 utilizes to compute the target-altitude 120 and target-azimuth 126.

In some configurations, a current-altitude output 118 and target-altitude output 120 are fed into a first control system 122 which utilizes a control strategy to drive a pitch actuator 124 such that current-altitude eventually converges with target-altitude as part of a closed control loop with the steerable device. The pitch actuator 124 in one embodiment contains a power gear which is used to drive a corresponding pitch gear in the steerable device when driver device is mechanically engaged with the steerable device. The pitch actuator 124 directly drives steerable device pitch and therefore the resulting output is sensed as feedback by way of the updated current steerable device pitch 102 as part of the control loop.

Similarly, in one embodiment, the current-azimuth output 128 and target-azimuth 126 are fed into a second control system 130 which utilizes a control strategy to drive a yaw actuator 132 such that current-azimuth eventually converges with target-azimuth as part of a closed control loop with the steerable device. The pitch actuator 124 in one embodiment contains a power gear which is used to drive a corresponding yaw gear when driver device is mechanically engaged with the steerable device. The yaw actuator 132 directly drives steerable device yaw and therefore the resulting output is sensed as feedback by way of the updated current steerable device yaw input 104 as part of the control loop.

In other configurations, current-azimuth output 128 and target-azimuth 126 result in an instruction generated for use by a user. The instruction can be in the form of one or more instructions for a user to steer the antenna to the optimal position in view of the data received. Thus, a user can select a target from a list or by giving detailed positional coordinates and a computing device, such as a mobile phone or tablet, can then use that information along with feedback from one or more of a compass, GPS, gyro and/or accelerometer in the computing device to provide instructions on which way to turn or elevate the steerable device and when the steerable device is optimally positioned.

Figure 4A:
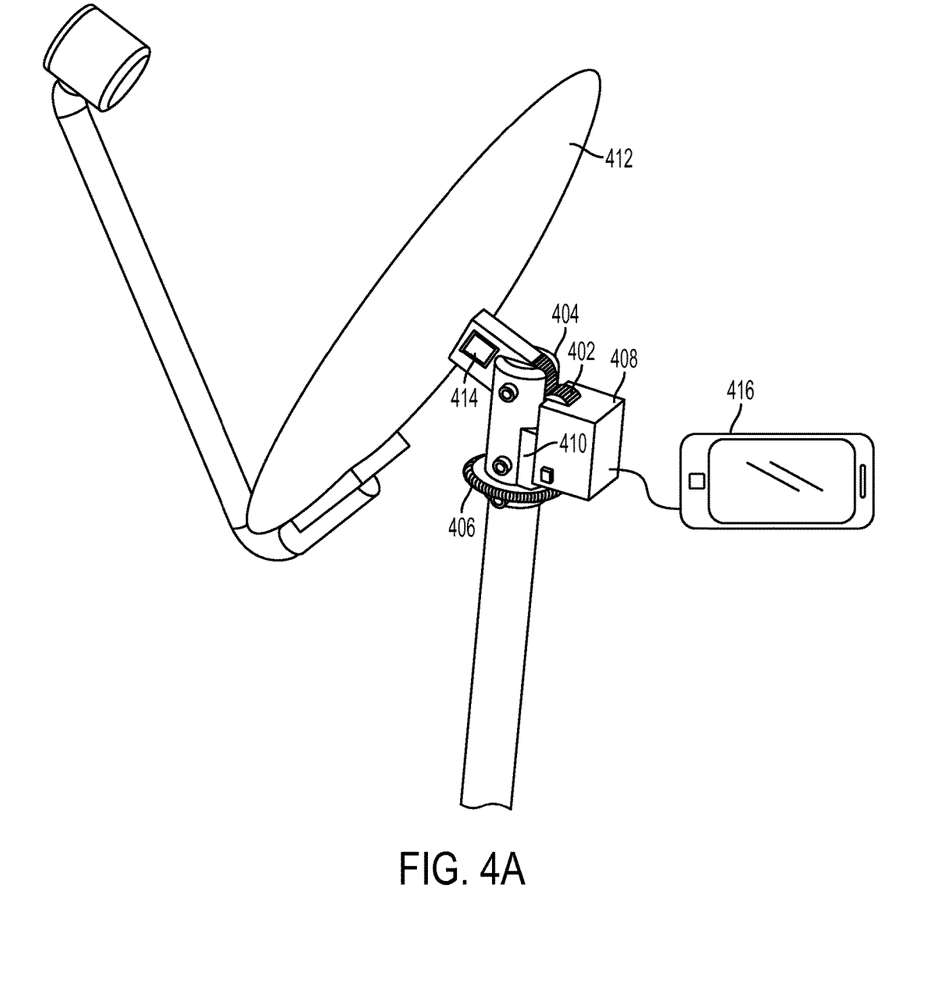
FIG. 4A illustrates a removable steering system when driver module is installed and engaged with an antenna; the image shows one embodiment of how a coupling mechanism on the antenna can hold and keep the driver module in place during steering.
Figure 4B:
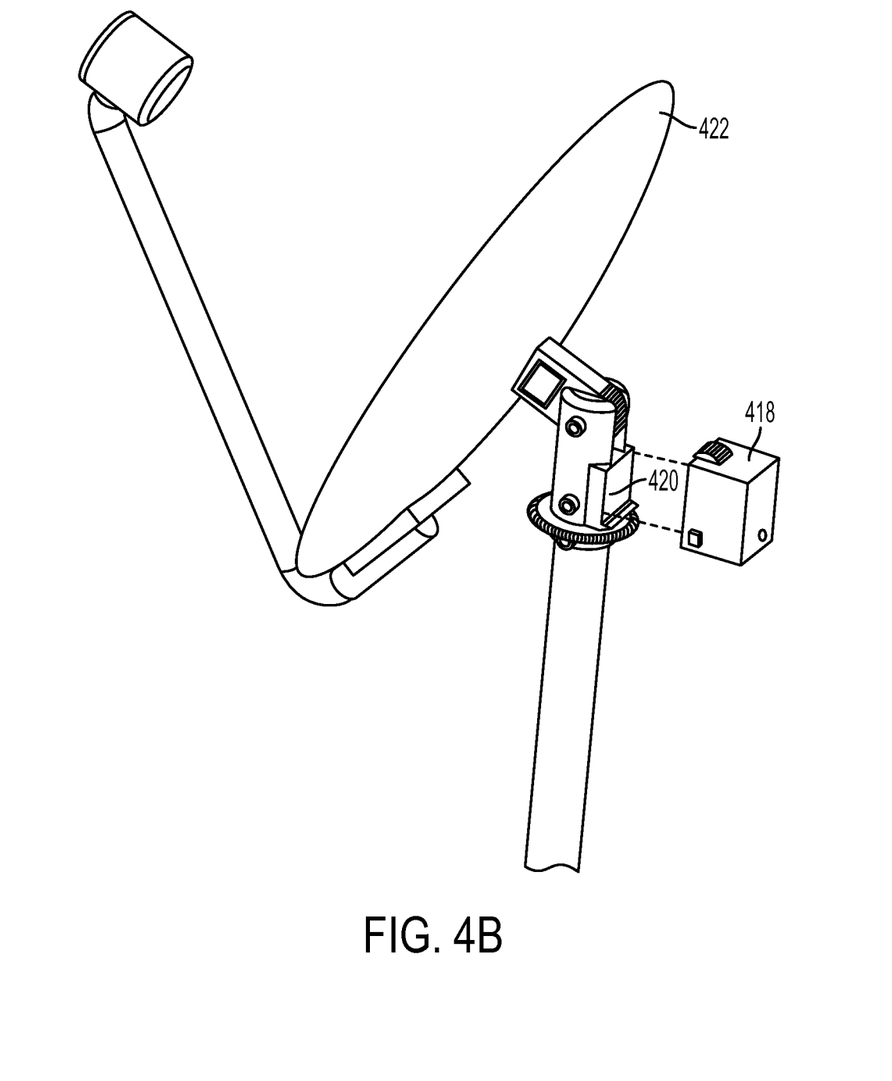
FIG. 4B illustrates a driver module decoupled from the antenna.

An illustration of the driver module in various stages of engagement with a steerable device, such as an antenna, is provided in FIG. 4A and FIG. 4B. In FIG. 4A, power gear from pitch actuator 402 can be seen driving pitch gear 404 of antenna 412. A power gear from a yaw actuator, situated beneath the driver module, is shown engaging with the yaw gear 406 of the antenna 412.

The mechanical coupling mechanism 410 is configurable to hold the actuators of the driver module 408 in place such that the gears from the driver module 408 and the antenna 412 can adequately mesh, allowing the driver module 408 actuators to steer the pitch and yaw of the antenna 412 to arrive at a target orientation. The target orientation is typically optimizable to provide the best satellite signal to the antenna.

In one aspect, the system is configurable so that a portable computing device, such as a tablet device 416, is in communication with the driver module 408. Where a portable computing device is utilized the portable computing device can be configured to implement part of the computation and control functions of the driver module 408. In such a configuration, the driver module 408 then implements the mechanical translations required in the antenna 412. Thus, the functions of the driver module 408 are implemented by combined action of the driver module 408 and the portable computing device, tablet 416.

In another aspect, the system incorporates a computing device, such as a tablet device 416, which is in communication with the driver module 408. Where the computing device is incorporated in the system, the computing device is configurable to implement part of the computation and control functions of the driver module 408. The driver module 408 then implements the mechanical translations required in the antenna 412.

FIG. 4B illustrates a driver module 418 detached from a mechanical coupling mechanism 420, wherein the antenna 422 is configurable to remain completely operational as an antenna, locked in place, and driver module 418 is able to connect with and drive other antennas.

II. Steerable Device

In the description below, the example described includes a configuration wherein a gear is used for each degree of freedom with a steerable device. In other configurations, pulleys, hydraulics, pneumatics or other mechanical translational devices and means might alternatively be employed to effect the same movements in the steerable device, where the steerable device is, for example, a satellite dish, telescope, optical laser communication device, satellite antennas, point terrestrial microwave antennas, or any other device that benefits from being steered.

In one example, one gear is configurable to correspond to pitch movement of the satellite dish and another gear is configurable to correspond to yaw movement. Each gear is actuatable by a mechanical translation which causes the parabolic satellite dish to steer towards a desired target altitude and azimuth of the selected satellite. One or more controllers may be used to control the movement of the pitch gear (i.e., the gear that rotates about an X axis) and the yaw gear (i.e., the gear that rotates about a Y axis).

Figure 2:
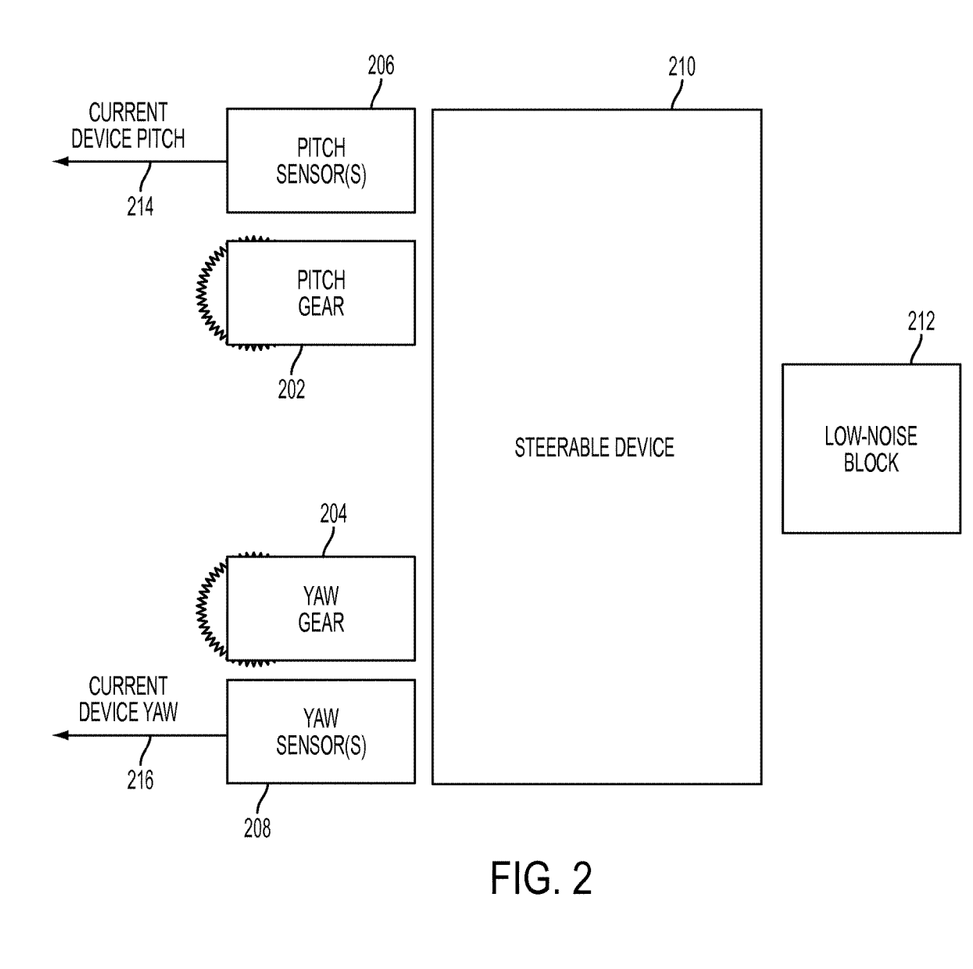
FIG. 2 is a block diagram of sub-systems comprising the steerable device, including yaw and pitch gears which manipulate the steerable device, as well as the yaw and pitch sensors.

FIG. 2 illustrates a block diagram of electro-mechanical sub-components of a steerable device. Movement of a pitch gear 202 is translatable to mechanical movement of the upward-tilting pitch of the parabolic steerable device 210. The pitch of the steerable device 210 can be sensed by one or more current pitch sensors 206. The one or more pitch sensors 206 are configurable to output a steerable device pitch signal 214, which can, in turn, be input into a driver module when connected to the steerable device. In some configurations, the current pitch sensor 206 is configurable to use an accelerometer to obtain a measure for absolute pitch position. The steerable device pitch signal 214 may, for example, be the raw accelerometer output, in order to minimize cost and complexity of the steerable device. Additionally, the steerable device pitch signal 214 can be provided dynamically in real-time, or near real time.

Movement of a yaw gear 204 translates to mechanical movement of a side-to-side yaw of the steerable device 210. The yaw of the steerable device 210 is sensed by one or more yaw sensors 208, which are configurable to output a steerable device yaw signal 216, which can, in turn, be input into the driver module when connected to the steerable device. Additionally, the steerable device yaw signal 216 can be provided dynamically in real-time, or near real time. Additionally, the steerable device yaw signal 216 may comprise, for example, a fusion of sensor readings including magnetic compass and a calibrated, relative potentiometer reading. Both readings may be raw in order to minimize cost and complexity of the steerable device.

Also connectable to the steerable device 210 is a low noise block 212 making the unit a functional steerable device.

Additional features of a suitable steerable device, such as a satellite dish, are illustrated in the visual schematic of the satellite dish in FIG. 4A. A driver module can be implemented by the combined actions of actuator device 408 and portable computing device such as tablet 416. Actuator device 408 drives pitch gear 404 effecting a controlled change in pitch of the satellite dish toward the target pitch dictated by the driver module. Actuator device 408 also drives yaw gear 406 effecting a controlled change in yaw of the satellite dish toward the target yaw dictated by the driver module. Sensors for yaw and pitch are housed in a sensor patch 414 which sends sensory data back to the device module.

Turning now to FIG. 4B, an illustration of a coupling mechanism 420 that permits the driving actuators from the driver module 418 to disengage with the gears and frame of the satellite dish 422 is provided. Upon disengagement, 422 remains locked and fully functional as a satellite dish and 418 retains the capability of engaging with and driving other satellite dishes.

Figure 4C:
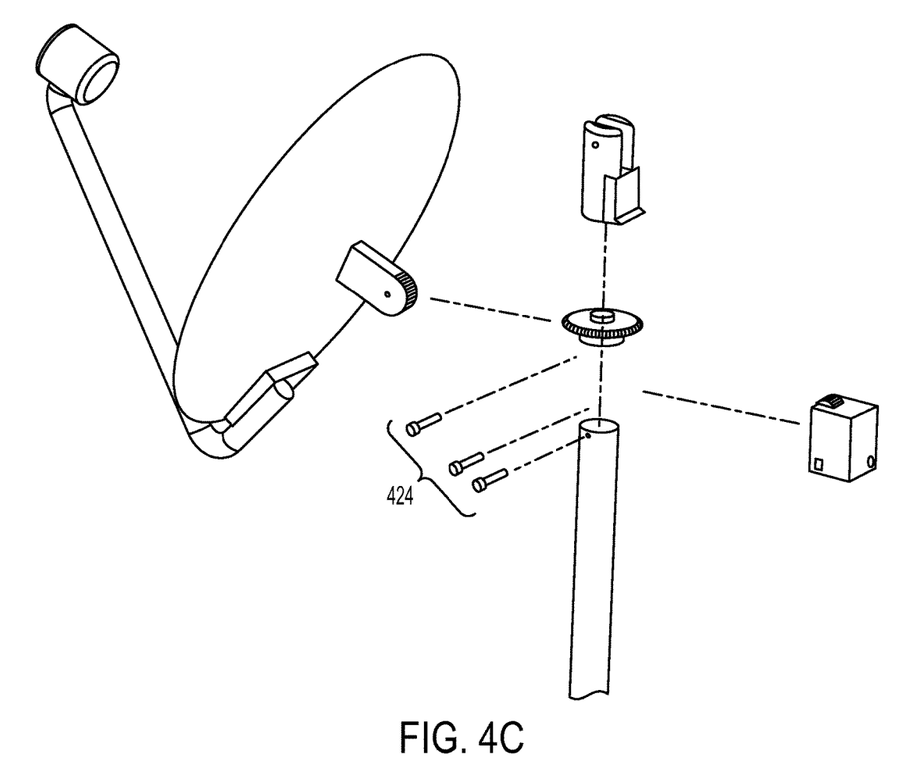
FIG. 4C illustrates a locking mechanism in the antenna, once the steering process is complete.

FIG. 4C illustrates a suitable locking mechanism for the satellite dish. In this example, three bolts 424 are shown to constrain yaw and pitch movements once the target orientation has been achieved. Other implementations may include variations of automatic and manual locking mechanisms.

III. Operation and Use of a Removable Steering System

Figure 3:
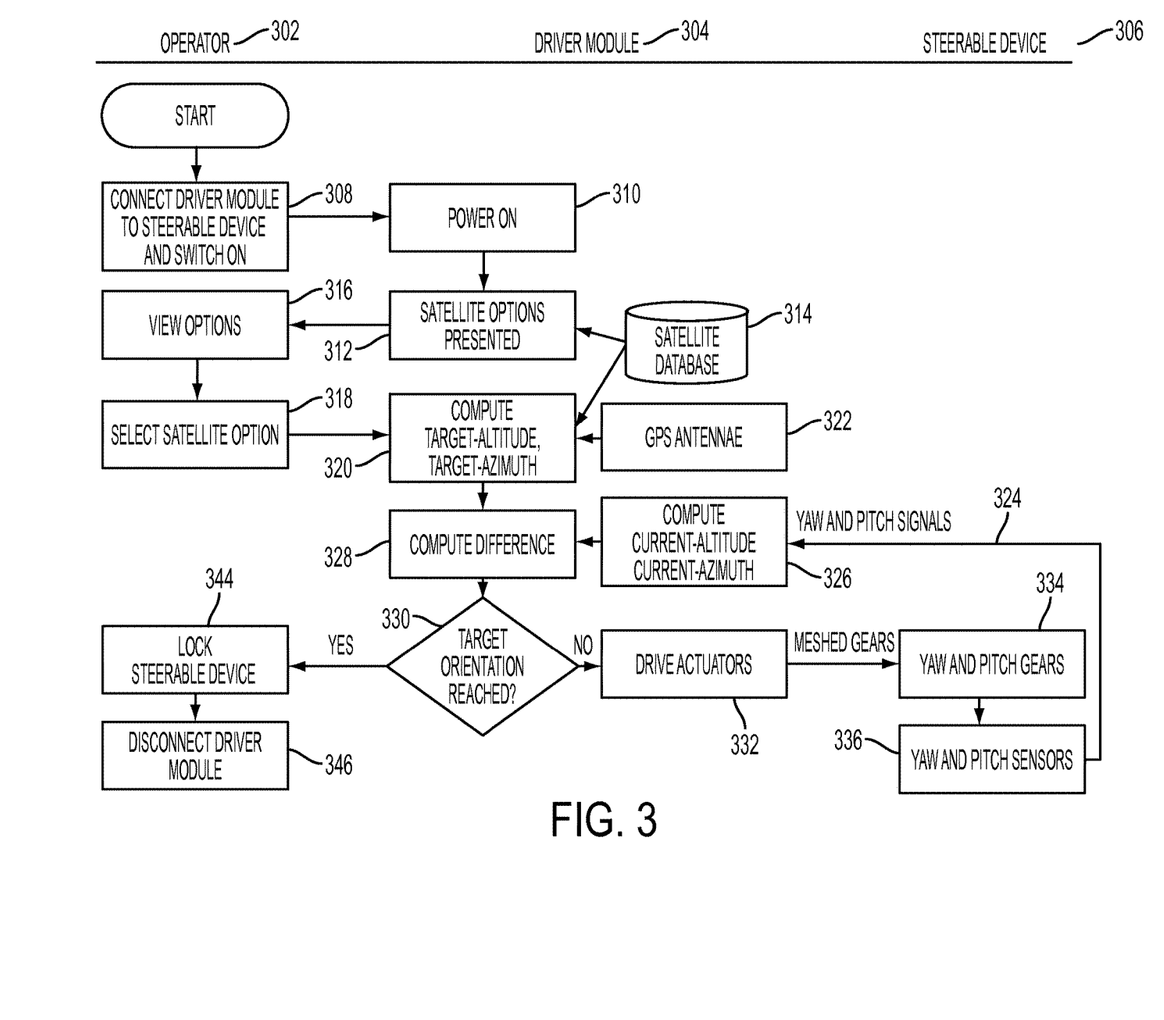
FIG. 3 illustrates the flow and operating functions of one implementation of the removable steering system, showing flow by which an operator, driver module and steerable device may interact.

FIG. 3 provides an illustration of a flow of a removable steering system, by way of an interaction diagram between three entities: an operator (or user) 302, a driver module 304 and a steerable device 306. As will be appreciated by those skilled in the art, the user can interact with a portable computing device and a driver module separately.

In step 308 an operator 302 commences the steering process by connecting the driver module 304 to a steerable device 306, unlocking the steerable device 306 and switching on the driver module 304. Driver module powers on 310 and, from a listing in connected satellite database 314, presents an interface of available options of satellites to steer the steerable device to 312. If there is just one satellite option, a simple confirmation button may be pressed by 302 to commence steering. Operator 302 views options 316 and selects desired satellite to steer to 318. Driver module 304 looks up or returns orbital data for selected satellite and obtains a local GPS location, in this implementation from a GPS antenna 322. The two data sources are combined to compute, relative to the position of the steerable device on the surface of the earth, a target-altitude and target-azimuth for the steerable device to align with the selected satellite 320. Driver module 304 processes current yaw and pitch signals from the steerable device 324 to compute current-altitude and current-azimuth 326.

A control loop is configurable to guide the steerable device to a target orientation. This can be implemented by the processes described herein. A difference between target coordinates from 320 and current coordinates from 326 is computed 328. A check is made in case the target has been reached 330 and if not, an algorithm accordingly drives the actuators 332 which from 308 has its gears meshed with steerable device yaw and pitch gears 334. Sensors measuring yaw and pitch 336 for the steerable device again are fed back 324 to the loop input to report current yaw and pitch orientation 326, wherein the new difference is again computed 328 and a determination is made on whether target orientation has been reached 330.

If target orientation has not been reached, the actuators 332 are again accordingly driven and the loop continues for another iteration back to 330. If the target orientation, has been reached, that is, if current-altitude is considered sufficiently close to target-altitude and current-azimuth is considered sufficiently close to target-azimuth, then the steering process halts and the operator is alerted by way of a visual or auditory notification. The operator can then lock the steerable device 344 into a position and disconnect the driver module 346.

IV. Examples

Figure 5:
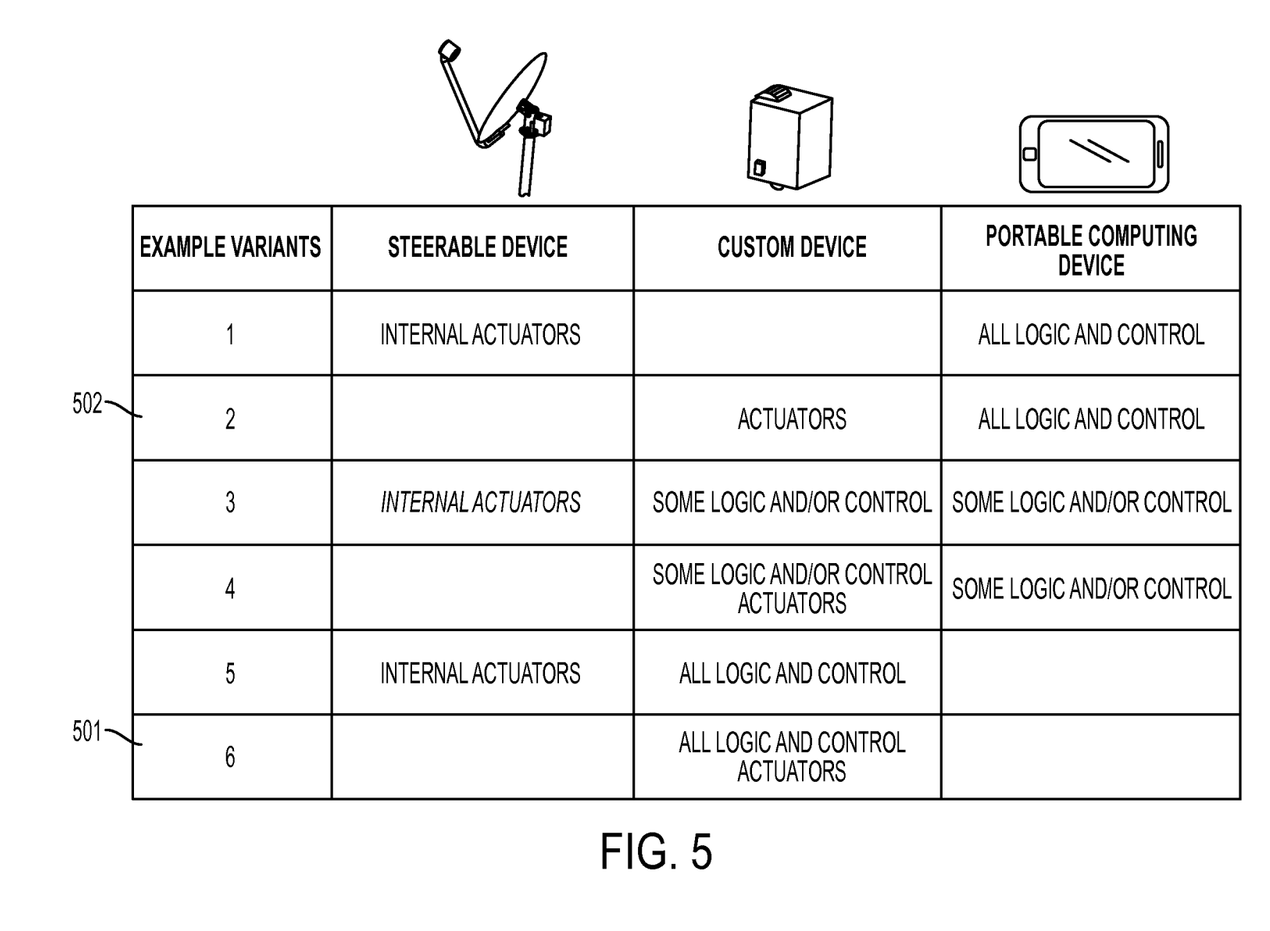
FIG. 5 is a table of design variants concerning the placement of logic, control and actuators.

FIG. 5 illustrates by example that some implementations of the disclosure may involve actuators driving movement to be located in the steerable device, whereas in other implementations the actuators are provided in the driver module. The driver module may itself be partially or wholly composed of a smartphone, tablet or other commercially available configurable computing device and may also include a custom device implementing functionality not provided by the smartphone/tablet component.

Power to drive the actuators may originate from the smartphone/tablet, the custom device, or the steerable device.

For example, Variant 6 501, a custom device may implement in itself all the functionality of the driver module and also house the actuators.

In another example, Variant 2 502, the smartphone/tablet may implement most or all of the logic, control and user interface, while a connected custom device houses the actuators and is used to mechanically engage with the steerable device.

In another example, a portable electronic device, such as a smartphone or tablet, is mountable on the steerable device such that the internal accelerometer of the portable electronic device is used to sense or measure the current altitude and azimuth of the steerable device.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as a BlackBerry®, iPhone®, a tablet, a laptop and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method that may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A steering system comprising:
   a steerable device having steerable device actuators;
   a removable steering system housing configurable to removably engage the steerable device;
   one or more drive actuators in communication with the steerable device actuators; and
   a controller configurable to receive a location and a motion of a target orbiting satellite and generate a positional instruction to the one or more drive actuators.

2. The steering system of 1 wherein the steering system includes one or more drivers which drive a position of the steerable device.

3. The steering system in 1 wherein the steering system includes a user interface.

4. The steering system in 1 wherein the steering system is configurable to communicate with an external computing device having a user interface.

5. A method for steering a steerable device comprising:
   attaching a removable steering system housing to the steerable device;
   obtaining a position of a target orbiting satellite;
   generating a positional instruction;
   delivering the positional instruction to the steerable device;
   locking a position of the steerable device based on the generated positional instruction; and
   removing the steering system.

6. The method for steering a steerable device of claim 5 comprising:
   instructing one or more drivers to drive a position of the steerable device from a first position to a second position.

7. The method for steering a steerable device of claim 5 comprising:
   selecting the target orbiting satellite from a list of available orbiting satellites.

8. The method for steering a steerable device of claim 5 comprising communicating with an external computing device.

9. A steerable device steering means comprising:
   a steerable device means for receiving a satellite signal having steerable device actuator means;
   a removable steering system housing means configurable to removably engage the steerable device actuator means for receiving the satellite signal;
   one or more drive actuators means in communication with the steerable device means; and
   a controller means configurable to receive a location and a motion of a target orbiting satellite and generate a positional instruction to the one or more drive actuators means of the means for receiving the satellite signal.

10. The steering system means of 9 wherein the housing means includes one or more actuators means and one or more drivers means which drive a position of the means for receiving the satellite signal.

11. The steering system means of 9 wherein the steering system means includes a user interface means.

12. The steering system means in 9 wherein the steering system means is configurable to communicate with an external computing device means.

13. A method for steering a means for receiving a satellite signal comprising:

attaching a removable steering system housing means to the means for receiving a satellite signal;

obtaining a position of a target orbiting satellite;

generating a positional instruction;

delivering the positional instruction to the means for receiving a satellite signal;

locking a position of the means for receiving a satellite signal based on the generated positional instruction; and removing the steering system means.

14. The method for steering the means for receiving the satellite signal of claim 13 comprising: instructing one or more positioning means to drive a position of the means for receiving the satellite signal from a first position to a second position.

15. The method for steering means for receiving the satellite signal of claim 13 comprising: selecting the target orbiting satellite from a list of available orbiting satellites.

16. The method for means for receiving the satellite signal of claim 13 comprising communicating with an external computing device means.

17. A steerable device system comprising:

a steerable device having one or more internal actuators;

a steering system having a housing configurable to removably engage the steerable device;

one or more drive actuators in communication with the one or more internal actuators of the steerable device; and a controller configurable to receive a location and a motion of a target orbiting satellite and generate a positional instruction to one or more drive actuators of the steering system.

18. The steerable device system of 17 wherein the steering system housing includes one or more drivers which drive a position of the steerable device.

19. The steerable device system in 17 wherein the steering system includes a user interface.

20. The steerable device system in 17 wherein the steering system is configurable to communicate with an external computing device having a user interface.

21. A steering system comprising:

a portable computing device having a GPS sensor and a compass sensor;

a steerable device having one or more actuators configured to removably engage the portable computing device;

one or more drive actuators in communication with the one or more steering device actuators; and a controller configurable receive data from the portable computing device and generate a positional instruction wherein the positional instruction is provided to at least one of a user and one or more drive actuators of the steerable device.

22. The steering system of 21 wherein the housing includes one or more actuators and one or more drivers which drive a position of the steerable device.

23. The steering system of 21 wherein the steering system is configurable to communicate with a remote computing device.

* * * * *